US012109720B2

(12) United States Patent
Crouzy et al.

(10) Patent No.: US 12,109,720 B2
(45) Date of Patent: Oct. 8, 2024

(54) HEAD OF A CUTTING DEVICE AND CUTTING DEVICE EQUIPPED WITH SAID HEAD

(71) Applicant: Airbus Operations SAS, Toulouse (FR)

(72) Inventors: Pierre Crouzy, Toulouse (FR); Pierre Nicoloso, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 279 days.

(21) Appl. No.: 17/856,304

(22) Filed: Jul. 1, 2022

(65) Prior Publication Data

US 2023/0012072 A1 Jan. 12, 2023

(30) Foreign Application Priority Data

Jul. 8, 2021 (FR) ...................................... 2107397

(51) Int. Cl.
*B26D 7/18* (2006.01)
(52) U.S. Cl.
CPC .................................. *B26D 7/1863* (2013.01)
(58) Field of Classification Search
CPC .................................................... B26D 7/1863
USPC ........................................................... 83/100
See application file for complete search history.

(56) References Cited

U.S. PATENT DOCUMENTS

| | | | | |
|---|---|---|---|---|
| 5,474,116 A | * | 12/1995 | Shoda | B23Q 11/0046 409/137 |
| 6,164,881 A | * | 12/2000 | Shono | B23Q 11/0816 409/137 |
| 8,650,997 B1 | * | 2/2014 | Simon | B26D 1/143 83/167 |
| 2002/0124701 A1 | * | 9/2002 | Caspar | B26D 7/1863 83/100 |
| 2004/0149115 A1 | * | 8/2004 | Ide | G11B 7/26 83/100 |
| 2007/0193759 A1 | | 8/2007 | Sweig et al. | |
| 2015/0059542 A1 | * | 3/2015 | Buser | A47L 7/0095 83/100 |
| 2015/0183130 A1 | * | 7/2015 | Gadd | B24B 55/02 83/100 |
| 2021/0069844 A1 | * | 3/2021 | Luu | B23Q 11/0071 |
| 2023/0081340 A1 | * | 3/2023 | Hawkins | B65G 13/04 83/13 |

FOREIGN PATENT DOCUMENTS

DE 102006012291 A1 10/2006
FR 3004667 A1 10/2014

* cited by examiner

*Primary Examiner* — Omar Flores Sanchez
(74) *Attorney, Agent, or Firm* — Greer, Burns & Crain, Ltd.

(57) ABSTRACT

A head of a cutting device includes a base configured to be fixed to a machine tool, a cylindrical suction nozzle integral with the base, a connector integral with the base and configured to receive a suction pipe. The suction nozzle is perforated by at least one oblong hole, for example parallel to an axis of the suction nozzle.

5 Claims, 3 Drawing Sheets

HEAD OF A CUTTING DEVICE AND CUTTING DEVICE EQUIPPED WITH SAID HEAD

CROSS-REFERENCES TO RELATED APPLICATIONS

This application claims the benefit of the French patent application No. 2107397 filed on Jul. 8, 2021, the entire disclosures of which are incorporated herein by way of reference.

FIELD OF THE INVENTION

At least one embodiment relates to a head of a cutting device, comprising a base intended to be fixed to a machine tool and a cylindrical suction nozzle integral with the base. At least one other embodiment relates to a cutting device equipped with the head.

BACKGROUND OF THE INVENTION

In the field of aeronautics, it is known practice to use cutting devices, e.g., for drilling or milling ("milling machine"), in order to be able to drill sections of an aircraft such as the pylons. The drilling of a pylon, which is generally made of titanium, produces titanium chips. In order to evacuate these, the cutting device is equipped with a head covering the cutting tool, e.g., a drill bit. The head comprises a base integral with a suction nozzle. It also comprises a connector to which a suction pipe connected to a vacuum device can be connected.

In order to avoid an increase in temperature in the cutting zone inside the head, the suction nozzle is generally perforated with small circular holes in order to supply sufficient air and thus discharge the heat produced during cutting.

However, with refractory material such as titanium, this air supply is insufficient. Thus, there is a risk of an outbreak of fire in the cutting zone. For example, incandescent chips risk being drawn in and setting fire to the suction pipes or even to the vacuum device.

It is desirable to overcome the various drawbacks of the prior art. It is, in particular, desirable to propose a cutting device which limits the risks of an outbreak of fire and, if necessary, detects an outbreak of fire.

SUMMARY OF THE INVENTION

At least one embodiment relates to a head of a cutting device. The head comprises:
  a base configured to be fixed to a machine tool;
  a cylindrical suction nozzle integral with the base and perforated by at least one oblong hole, for example parallel to an axis of the suction nozzle;
  a connector integral with the head and configured to receive a suction pipe.

The addition of one or more oblong holes makes it possible to increase the supply of fresh air into the cutting zone and thus to avoid an increase in temperature in this zone. Moreover, the oblong holes, by virtue of their particular shape and their orientation, also allow fragmentation of the chips. Since the chips are smaller, they can be evacuated more easily, thereby reducing the risk of an outbreak of fire and improving the quality of cutting.

In one embodiment, the suction nozzle is perforated by circular holes along the edge of an end configured to press against a part to be cut.

In one embodiment, the at least one oblong hole is formed of two circular arcs connected by longitudinal straight lines, each circle having a diameter of 12 mm and the distance between the centers of the circles being 10 mm.

A cutting device comprising a head according to one of the above embodiments is also described. It additionally comprises:
  a mount to which the head is fixed; and
  a drive system in which a cutting tool is fixed, the drive system being configured to drive the cutting tool in rotation about its axis and in translation parallel to the axis.

In one embodiment, the suction nozzle and the cutting tool are coaxial.

In one embodiment, the cutting device also comprises at least one infrared sensor fixed in a hole that is formed in the wall of the head and opens onto a cutting zone inside the head, the infrared sensor being connected to a module for detecting an outbreak of fire.

A system comprising a cutting device according to one of the above embodiments is also described. The system additionally comprises a control module configured to safeguard the cutting device if an outbreak of fire is detected by the detection module, the module for detecting an outbreak of fire and the control module being connected by wireless communication.

BRIEF DESCRIPTION OF THE DRAWINGS

The features of the invention that are mentioned above, and others, will become more clearly apparent from reading the following description of an exemplary embodiment, the description being given in relation to the appended drawings, in which.

DETAILED DESCRIPTION OF THE PREFERRED EMBODIMENTS

Figure 1:
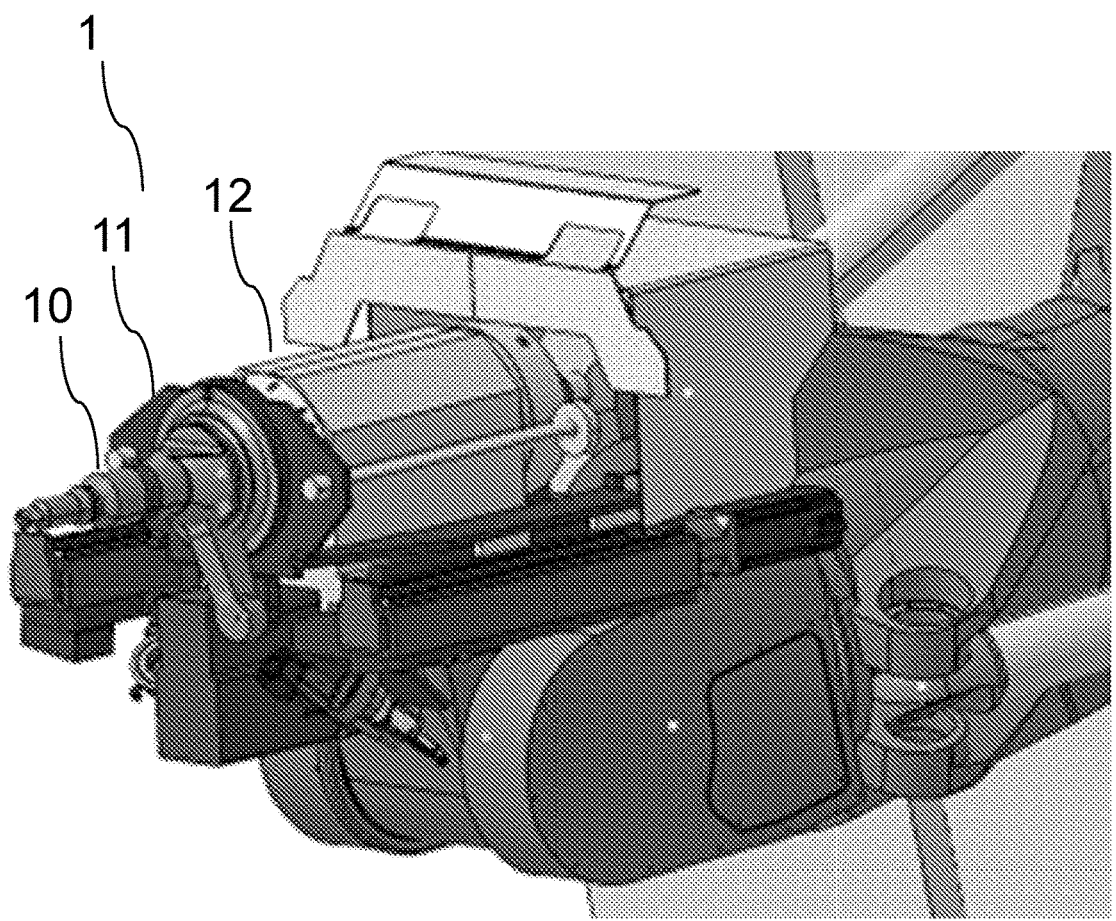
FIG. 1 illustrates a cutting device in which the present invention can be implemented.

FIG. 1 illustrates a cutting device 1, for example a drilling or milling device, in which the present invention can be implemented. The cutting device 1 comprises a head 10 mounted on a mount 11 of a machine tool 12. The head 10 covers a cutting tool which is not visible in FIG. 1, e.g., a drill bit or a drill, fixed to a drive system. In other words, the cutting tool is located in the interior cavity, known as the cutting zone, of the head 10. The drive system is configured to drive the cutting tool in rotation about its axis and in translation parallel to the axis of rotation for cutting purposes, e.g., drilling, milling.

Figure 2:
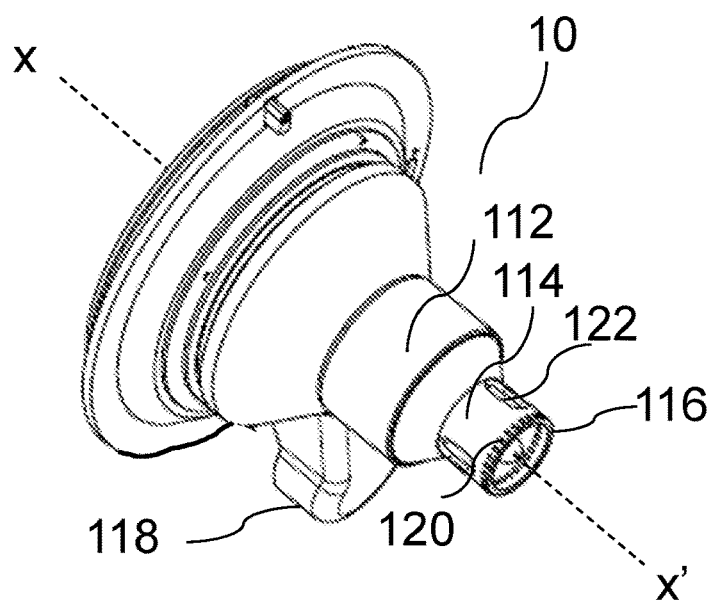
FIG. 2 schematically illustrates a head of the cutting device according to one particular embodiment.

FIG. 2 schematically illustrates the head 10 of the cutting device 1 according to one particular embodiment. The head 10 comprises a base 112 and a suction nozzle 114 of cylindrical shape that is integral with the base 112. One of the ends 116 of the suction nozzle 114 is intended to be pressed against the surface of a part to be cut such that the chips produced during the cutting of the part are drawn in by the suction nozzle 114.

The head 10 additionally comprises a connector 118 integral with the nozzle 114 and configured to receive a suction pipe 119 in FIG. 2. The suction pipe 119 is configured to be connected to a vacuum device. Thus, the chips produced during cutting are drawn in by the suction nozzle 114 and then ejected by the connector 118 into the suction pipe 119.

In FIG. 2, the suction nozzle 114, which has a cylindrical shape, is perforated with through-holes. It is, in particular, perforated with circular holes 120 passing through the wall of the suction nozzle 114. These circular holes 120 are disposed along the edge of the end 116 that is intended to be pressed against the surface of the part to be cut. Advantageously, the suction nozzle 114 is also perforated with at least one oblong through-hole 122 which is parallel to the main axis XX' of the suction nozzle 114. In one particular embodiment, the suction nozzle 114 is perforated with three oblong holes.

In another embodiment (not shown), the suction nozzle 114 is perforated only with one or more oblong holes 122, i.e., the circular holes 120 are absent.

The addition of one or more oblong holes makes it possible to increase the supply of fresh air into the cutting zone and thus to avoid an increase in temperature in this zone. Furthermore, this additional supply of air allows more rapid evacuation of the chips from the cutting zone to the vacuum device by increasing the air flow rate in the cutting zone. The risk of having chips stick to the walls of the head 10 is thus reduced. Moreover, the oblong holes, by virtue of their particular shape and their orientation parallel to the main axis XX', also allow fragmentation of the chips which, when they are drawn in by the suction nozzle 114, hit the edges of the oblong holes and are thus fragmented. The fragmentation of the chips also makes it possible to reduce the risk of an outbreak of fire and to improve the quality of cutting. This is because the smaller size of the chips makes them easier to evacuate. The risk of chips accumulating en masse in the cutting zone is reduced, this also reducing the risk of an outbreak of fire, in particular, in the case in which a hot chip needs to be evacuated. Furthermore, since the chips are smaller, the risk of them wrapping around the cutting tool is also reduced. This is particularly advantageous since an accumulation of chips around the cutting tool can have a detrimental effect on the quality of cutting by damaging the edges of the cut and by damaging the drill bit. This is because the drill bit is generally made of carbide, which is structurally bonded by cobalt. It is therefore appropriate to limit the heat so as not to impair the carbide.

Figure 3:
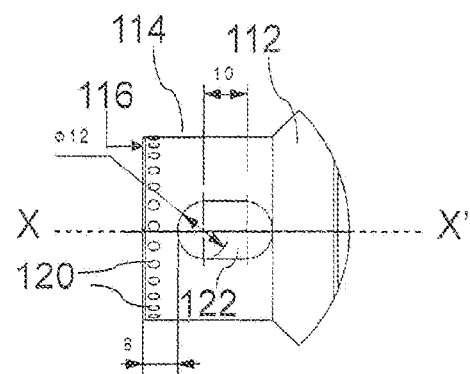
FIG. 3 schematically illustrates a side view of a suction nozzle belonging to the head of the cutting device according to one particular embodiment.

FIG. 3 schematically illustrates a side view of the suction nozzle 114 according to one particular embodiment. The wall of the suction nozzle 114 is perforated with circular through-holes 120 disposed along the edge of the end 116 intended to be pressed against the surface of the part to be cut. Conventionally, the circular holes 120 have diameter of 2 to 3 mm. In an embodiment variant, the circular holes 120 are absent. The suction nozzle 114 is also perforated with at least one oblong through-hole 122 which is parallel to its main axis XX'.

In one particular embodiment, the oblong holes 122 are formed of two circular arcs connected by longitudinal straight lines, each circle having a diameter of 12 mm and the distance between the centers of the circles being 10 mm. In FIG. 3, the oblong hole 122 is 8 mm from the edge of the end 116. More generally, the oblong holes are calibrated such that there is more air to enter the suction nozzle 114 than there is air to exit via the suction pipe 119. Thus, the chips are evacuated more rapidly into the suction nozzle connected to the connector 118. In other words, they are calibrated such that the air flow rate in the cutting zone is greater than the suction air flow rate.

Figure 4:
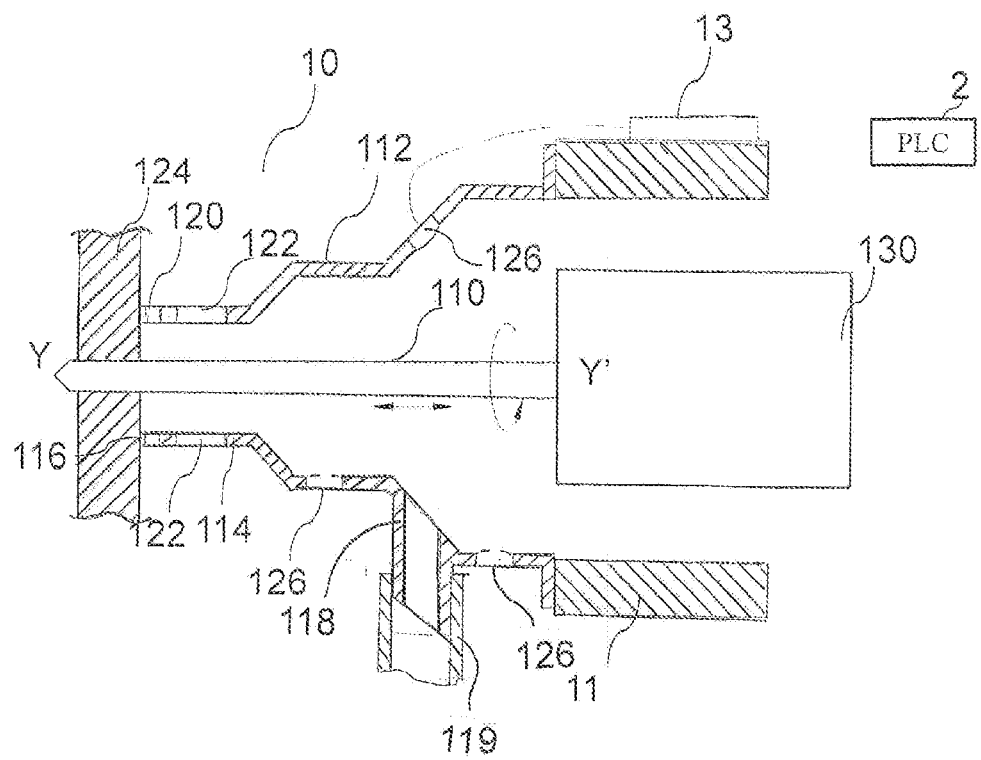
FIG. 4 schematically illustrates a view in cross section of the head of the cutting device according to one particular embodiment.

FIG. 4 schematically illustrates a view in cross section of the head 10 of the cutting device 1 according to one particular embodiment.

The elements that are identical to the elements shown in FIGS. 1 to 3 are identified by the same reference numerals in FIG. 4. The base 112 of the head 10 is fixed to the mount 11 of the cutting device 1. The cutting device 1 comprises a drive system 130 to which a cutting tool 110 is fixed. The drive system 130 is configured to drive the cutting tool 110 in rotation about its axis YY' and in translation parallel to the axis of rotation such that the cutting tool 110 can exit the suction nozzle 114 during cutting in order, for example, to drill the part 124 in contact with the end 116. Preferably, the cutting tool 110 and the suction nozzle 114 are coaxial, i.e., the axes XX' and YY' are coincident.

The wall of the suction nozzle 114 is optionally perforated with circular through-holes 120 and with at least one oblong through-hole 122. In a variant that is not shown, the circular holes 120 are absent and the suction nozzle 114 only comprises one or more oblong holes 122.

In one particular embodiment, the wall of the head 10 also comprises at least one infrared sensor 126. The infrared sensor 126 is positioned, in the region of the base 112 or of the suction nozzle 114, either in a through-hole in the wall of the head or in a blind hole that opens onto the cutting zone such that the infrared sensor has a direct view of the cutting zone. The infrared sensor 126 is configured to sense infrared radiation and can thus detect an outbreak of fire (e.g., a spark) arising in the cutting zone. This is because the infrared sensor 126 is sensitive to the infrared radiation emitted by a spark or a flame. One or more infrared sensor 126 may optionally be fixed in the wall of the connector 118.

The infrared sensor or sensors 126 are connected in a wired manner to a module for detecting an outbreak of fire 13, which is powered by a battery. In one embodiment, the level of charge of the battery is monitored in order to send an alert to a control module 2 in the event of low charge, e.g., below a threshold value. Thus, the detection module is certain to be active by virtue of a charged battery. The detection module 13 may be fixed to the cutting device 1 or positioned next to the latter. Thus, when an infrared sensor 126 senses infrared radiation, it sends an electrical signal via the wire to the detection module 13. In FIG. 4, only on wire is depicted in order to avoid overloading the figure. However, all the infrared sensors 126 are connected to the detection module 13. Thus, in the event of an outbreak of fire or even in the event of a spark in the cutting zone, the infrared sensor 126 detects the infrared radiation and sends an analogue signal via the wire to the detection module 13. The analogue signal is compared with a variable detection threshold at the detection module 13. The comparison with a detection threshold makes it possible to avoid indicating an outbreak of fire in the event of infrared radiation of very low amplitude. In one particular embodiment, the detection module 13 comprises a multiplexer which, on the basis of different analogue signals received from the different infrared sensors 126 and thresholded by the detection module 13, generates an RF (acronym for radiofrequency) wireless communication frame which is transmitted to a control module 2 associated with the cutting device 1 in order to indicate to the latter that an outbreak of fire has been detected. The multiplexing therefore makes it possible, on the basis of the analogue signals thresholded, to send a binary signal to the control module 2 in order to indicate to the latter the detection or non-detection of an outbreak of fire in the cutting zone. For example, if at least one of the infrared sensors 126 sends an analogue signal that is above the detection threshold, the RF frame includes information indicating the detection of an outbreak of fire in the cutting zone to the control module 2.

In one particular embodiment, the control module 2 is wirelessly connected to a plurality of detection modules 13, each detection module 13 being associated with a particular cutting device 1. Each detection module 13 is thus paired with the control module 2 and thus defines a detection line. There are therefore as many detection lines as there are detection modules 13 paired with the control module 2. For this reason, an identifier is sent at the start of each RF wireless communication frame in order to identify the detection line in question, i.e., the detection module 13 that has sent the frame.

In another embodiment, the control module 2 is wirelessly connected to a single detection module 13. In this particular case, there is no need to send an identifier at the start of each RF wireless communication frame.

The control module 2 is for example a PLC (programmable logic controller), i.e., a programmable digital electronic device intended to control industrial processes. The detection module 13 and the control module 2 operate for example in the ISM (acronym for "Industrial, Scientific and Medical") frequency band of 433 MHz or in the FCC (acronym for Federal Communications Commission) frequency band, which ranges approximately from 150 kHz to 480 kHz. Furthermore, FSK (acronym for Frequency-Shift Keying) modulation is for example used.

The detection module 13 therefore sends a binary signal to the control module 2 in order to indicate to the latter whether or not an outbreak of fire has been detected in the cutting zone. If an outbreak of fire has been detected, the control module 2 is informed. The control module 2 retrieves the RF wireless communication frame and converts it into a binary digital output signal (0 or 1) for each detection line, i.e., for each detection module 13 with which the control module 2 is paired, and thus safeguards the cutting device 1 associated with the detection module 13. If the output has a value of 0, an outbreak of fire has not been detected for this detection line, and if the output is 1, an outbreak of fire has been detected. It can then make certain decisions in the event of an outbreak of fire being detected and in particular safeguard the cutting device 1. To this end, it may, for example, stop the cutting, cut the suction by using for example guillotine valves, cut the lubrication and/or output a visual and/or audible warning signal, for example by means of a flashing light and/or a siren. The reaction time of such a system is very quick, around 60 ms between the detection of an outbreak of fire in the cutting zone and the decision making by the control module 2.

The cutting device 1, the detection module 13 and the control module 2 configured to safeguard the cutting device 1 if an outbreak of fire is detected by the detection module 13 form a system.

Figure 5:
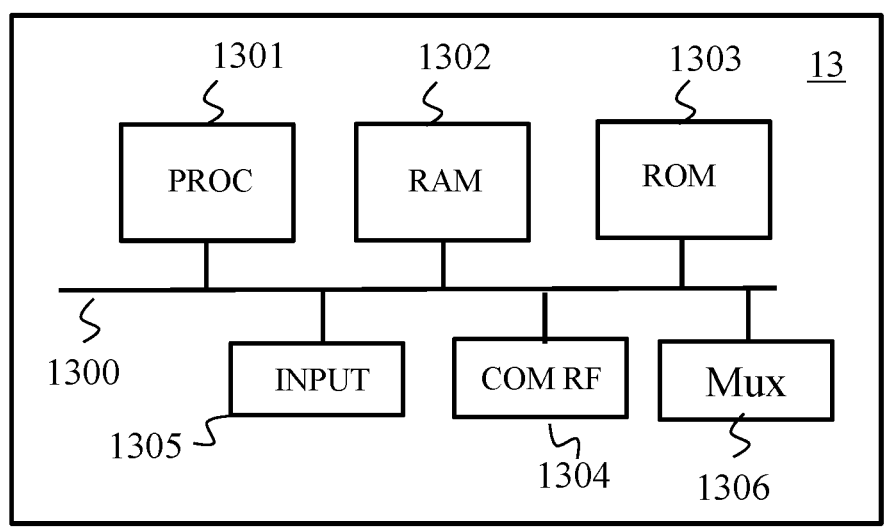
FIG. 5 shows the material architecture of a detection module according to one particular embodiment.

FIG. 5 shows the material architecture of the detection module 13.

According to the example of a material architecture that is shown in FIG. 5, the detection module 13 thus comprises, connected by a communication bus 1300: a process or CPU ("Central Processing Unit") 1301; a RAM ("Random Access Memory") 1302; a ROM ("Read Only Memory") 1303; at least one radiofrequency communication interface 1304 allowing the detection module 13 to send or receive information; an analogue input interface 1305 provided with an ADC (acronym for "Analog to Digital Converter") for retrieving the status of the input signals. The radiofrequency communication interface 1305 is for example compatible with the 433 MHz FSK RF protocol. Optionally, the detection module 13 comprises a multiplexer 1306 configured to generate an RF wireless communication frame from different analogue signals received from different infrared sensors 126 and thresholded. The multiplexer 1306 may be integrated into the CPU 1301 or be a separate element connected to the CPU 1301.

The processor 1301 is capable of executing instructions loaded into the RAM 1302 from the ROM 1303, or coming from a communication network when the status of the analogue input signals changes. When the detection module 13 is turned on, the processor 1301 is capable of reading instructions from the RAM 1302 and of executing them. In particular, the detection module 13 is configured to compare the analogue input signals with the variable detection threshold and to generate the RF frame which is transmitted to the control module 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cutting device comprising
    a head, said head comprising:
        a base configured to be fixed to a machine tool;
        a cylindrical suction nozzle integral with the base;
        a connector integral with the head and configured to receive a suction pipe;
            said suction nozzle being perforated by at least one oblong hole parallel to an axis of said suction nozzle,
    a mount to which said head is fixed;
    a drive system in which a cutting tool is fixed, said drive system being configured to drive said cutting tool in rotation about an axis and in translation parallel to said axis; and
    at least one infrared sensor fixed in a hole that is formed in a wall of said head and opens onto a cutting zone inside said head, said infrared sensor being connected to a detection module for detecting an outbreak of fire.

2. The cutting device according to claim 1, wherein the suction nozzle is perforated by circular holes along an edge of an end configured to press against a part to be cut.

3. The cutting device according to claim 1, wherein said at least one oblong hole is formed of two circular arcs connected by longitudinal straight lines, each arc having a radius of 6 mm and a distance between centers of the circular arcs being 10 mm.

4. The cutting device according to claim 1, wherein said suction nozzle and said cutting tool are coaxial.

5. A system comprising
   a cutting device according to claim 1, and
   a control module configured to safeguard said cutting device if an outbreak of fire is detected by said detection module,
      said module for detecting the outbreak of fire and said control module being connected by wireless communication.

* * * * *